United States Patent
Wu et al.

(10) Patent No.: US 11,892,742 B2
(45) Date of Patent: Feb. 6, 2024

(54) METHOD FOR CALIBRATING CONTROLLABLE PHASE SHIFTERS IN MULTI-STAGE STAGGERED MACH-ZEHNDER INTERFEROMETER ON OPTICAL CHIP

(71) Applicant: NATIONAL UNIVERSITY OF DEFENSE TECHNOLOGY, Hunan (CN)

(72) Inventors: Junjie Wu, Hunan (CN); Yang Wang, Hunan (CN); Xiaogang Qiang, Hunan (CN); Ping Xu, Hunan (CN); Jiangfang Ding, Hunan (CN); Mingtang Deng, Hunan (CN); Anqi Huang, Hunan (CN); Xiang Fu, Hunan (CN)

(73) Assignee: NATIONAL UNIVERSITY OF DEFENSE TECHNOLOGY, Hunan (CN)

( * ) Notice: Subject to any disclaimer, the term of this patent is extended or adjusted under 35 U.S.C. 154(b) by 477 days.

(21) Appl. No.: 17/016,383

(22) Filed: Sep. 10, 2020

(65) Prior Publication Data

US 2021/0072613 A1    Mar. 11, 2021

(30) Foreign Application Priority Data

Sep. 10, 2019   (CN) .......................... 201910853386.3

(51) Int. Cl.
G02F 1/225   (2006.01)
G02F 1/21    (2006.01)

(52) U.S. Cl.
CPC .............. *G02F 1/225* (2013.01); *G02F 1/212* (2021.01)

(58) Field of Classification Search
CPC .......... G03B 6/43; G02B 6/4214; G02B 6/12; G02B 6/12007; G02B 6/4246
See application file for complete search history.

(56) References Cited

U.S. PATENT DOCUMENTS

| | | | |
|---|---|---|---|
| 9,103,649 B2* | 8/2015 | Sykora | G01B 9/0201 |
| 2011/0032529 A1* | 2/2011 | Wan | G01J 3/45 |
| | | | 356/243.1 |
| 2018/0102628 A1* | 4/2018 | Parker | H01S 5/0085 |
| 2020/0110992 A1* | 4/2020 | Hosseinzadeh | G06N 3/0445 |

* cited by examiner

Primary Examiner — Christopher Stanford
Assistant Examiner — Journey F Sumlar
(74) Attorney, Agent, or Firm — JCIP GLOBAL INC.

(57) ABSTRACT

The present invention discloses a method for calibrating controllable phase shifters in a multi-stage staggered Mach-Zehnder interferometer structure on an optical chip, aiming to solve the problem of calibrating the controllable phase shifters in a configurable optical network of the multi-stage staggered Mach-Zehnder interferometers. The technical solution is to calibrate the controllable phase shifters that can be calibrated in the optical network; and then to constitute calibration conditions for and calibrate inner phase shifters that has not been; and finally to constitute calibration conditions for and calibrate outer phase shifters that is not calibrated.

1 Claim, 2 Drawing Sheets

METHOD FOR CALIBRATING CONTROLLABLE PHASE SHIFTERS IN MULTI-STAGE STAGGERED MACH-ZEHNDER INTERFEROMETER ON OPTICAL CHIP

CROSS-REFERENCE TO RELATED APPLICATION

This application claims the priority benefit of China application serial no. 201910853386.3, filed on Sep. 10, 2019. The entirety of the above-mentioned patent application is hereby incorporated by reference herein and made a part of this specification.

BACKGROUND

Technical Field

The present invention relates to an optical field, in particular to a method for calibrating optical devices in an optical network formed by the connection of a plurality of optical devices, and more particularly to a method for calibrating phase shifter parameters in phase shifter and beamsplitter networks integrally and optically implemented.

Description of Related Art

A configurable optical network is an important component of an integrated optical chip (optical chip for short) and capable of implementing a variety of functions in a configurable manner. The configurable optical network has significant applications in the research interests such as the current optical chip and optical information processing, etc.

A multi-stage staggered Mach-Zehnder interferometer structure, a configurable optical network, is an important structure on the optical chip. The multi-stage staggered Mach-Zehnder interferometer structure has the following definitions: 1. Basic units of a multi-stage staggered Mach-Zehnder interferometer structure (basic unit for short) are Mach-Zehnder interferometers. Each basic unit is composed of two beamsplitters, two controllable phase shifters and some necessary connecting optical waveguides. Each basic unit includes two optical input ports and two optical output ports, and two groups of electrical input ports (every group generally has two electrical input ports, both of which are connected to one controllable phase shifter). Each beamsplitter is generally designed with an optical signal splitting ratio of 50:50; each controllable phase shifter is configured to control a phase of an optical signal through an electrical signal. In the Mach-Zehnder interferometer including the two controllable phase shifters, one controllable phase shifter is located between the two beamsplitters, and the other one is located outside the two beamsplitters. The phase shifter located between the two beamsplitters is called an inner phase shifter, and the phase shifter outside the two beamsplitters is called an outer phase shifter. Unless otherwise specified, the inner and outer phase shifters herein are relative to the basic units. 2. The multi-stage staggered Mach-Zehnder interferometer structure is constituted by the connection of a plurality of basic units, wherein any two mutually connected adjacent basic units conform to a "staggered condition", namely the two outputs of one basic unit are only connected to the two inputs of two different basic units, instead of being respectively connected to the two inputs of another basic unit. When optical signal is input into the optical network, the interferometers can be divided into different stages levels in an order in which the optical signal passes through the basic units.

The controllable phase shifters are an important device used for configuring different functions of the optical network, including an electrical input port and an optical input and an output port. When an electrical signal V is input, a phase P of the optical signal is set generated. A relation between P and V can be expressed as a function including N parameters. N is determined by the processing characteristics of the controllable phase shifters, and N is a positive integer generally no more than 5.

$$P=f(V, \lambda_1, \lambda_2, \ldots, \lambda_N)$$

Wherein $\lambda_1, \lambda_2, \ldots, \lambda_N$ are N parameters of the controllable phase shifters. It is difficult to determine the parameters of the controllable phase shifters at a chip manufacture stage due to the limited integrated optical chip manufacture technology level at the current stage. Upon the chip manufacture, a chip calibration test is needed to calculate the parameters $\lambda_1, \lambda_2, \ldots, \lambda_N$ of the controllable phase shifters. This is a problem of calibrating the parameters of the controllable phase shifters.

Generally, three calibration conditions are necessarily met to calibrate the parameters of the controllable phase shifters. Condition A: the Mach-Zehnder interferometer structure condition, namely the controllable phase shifter to be calibrated is an inner phase shifter of a certain Mach-Zehnder interferometer. There are two categories of Mach-Zehnder interferometers in an optical network. One is composed of the phase shifters and the beamsplitters in the optical network, such as the basic units of the multi-stage staggered Mach-Zehnder interferometer structure; the other one is the Mach-Zehnder interferometer, usually used for the calibration of the outer phase shifter, that is constituted by setting the basic units calibrated in the optical network to be in a straight waveguide mode and a beamsplitter mode. Condition B: single-port optical signal input condition: namely for the interferometer, only an optical signal is input into one input port, but no optical signal is input into another input port. Condition C: direct independent output measurement condition, namely the strength of the optical signal can be measured from single optical output port of the interferometer. The interferometer has two optical output ports. The direct independent output measurement condition requires that the strength of the optical signal of any output port can be measured.

For the controllable phase shifters that conform to three calibration conditions, the general calibration method (calibration method with the satisfactory calibration conditions) is as follows: 1. According to the calibration condition A, identifying the interferometer structure which takes the phase shifter to be calibrated as the inner phase shifter; 2. Depending on the calibration condition B, inputting the optical signal into single port of the interferometer; 3. Applying a group of different electrical signals V to the controllable phase shifter to be calibrated, and meanwhile measuring the power I of a corresponding group of output optical signals depending on the calibration condition C; 4. Depending on a mathematic model of the interferometer, calculating a phase P corresponding to the strength I of the group of optical signals to solve an equation set of the above P and V to obtain the parameters $\lambda_1, \lambda_2, \ldots, \lambda_N$ of the controllable phase shifter.

For the optical network of the multi-stage staggered Mach-Zehnder interferometer structure having the number of stages less than the number of optical input ports, the current method for calibrating the controllable phase shifters in the optical network is as follows: 1. searching the controllable phase shifters that naturally meet the three calibration conditions in the optical network, and calibrating the same through the above method; 2. constituting the larger Mach-Zehnder interferometer by setting calibrated controllable phase shifters (such as setting to be in the straight waveguide mode or the beamsplitter mode), and calibrating the new controllable phase shifters. However, the optical network, with the number of stages more than the number of the optical input ports, has no controllable phase shifters that naturally meet the three calibration conditions. In the optical network, an entire optical signal transmission path has a plurality of controllable phase shifters that jointly affect the strength of the output optical signals from the certain optical input port to the certain optical output port. If the parameters of these controllable phase shifters are solved by solving the mathematical equation of P and V, the size of the equation solution space will increase as the number of controllable phase shifters increases, which cannot be applicable to the practical applications.

At present, there is a hardware method of adding detection units on the optical chip, namely the controllable phase shifters, which naturally meet the three calibration conditions, are constituted by adding detection units on the optical chip, namely the controllable phase shifters, which naturally meet the three calibration conditions, are constituted by adding optical signal detection units on the optical network. This hardware method will increase the complexity of the optical chip and introduce the new overheads, such as optical loss.

SUMMARY

With respect to the problem of calibrating controllable phase shifters in a configurable optical network of a multi-stage staggered Mach-Zehnder interferometer structure, the present invention provides a new method for calibrating controllable phase shifters, which is applicable to a task of, without increasing any hardware, calibrating controllable phase shifter parameters in the configurable optical network of the multi-stage staggered Mach-Zehnder interferometer structure with any number of stages and any structure.

The technical solution of the present invention is as follows:

step 1, applying the calibration method with satisfactory conditions to calibrate the controllable phase shifters that can be calibrated in the optical network; when these phase shifters cannot conform to the three calibration conditions such that if some controllable phase shifters can't be calibrated, executing step 2; turning to step 11 if all controllable phase shifters can be calibrated;

step 2, selecting the inner phase shifter of the basic unit (namely one Mach-Zehnder interferometer) that is not calibrated and is closest to an output end of a multi-stage staggered Mach-Zehnder interferometer network and marking it as i (the controllable phase shifter conforms to the condition A), and constituting the calibration condition C; setting all basic units with the inner phase shifters calibrated to be in a straight waveguide mode (namely the power supply inputs the electrical signal corresponding to a $\pi$ phase to the inner phase shifter), so as to conform to the calibration condition C;

step 3, verifying whether the inner phase shifter i conforms to the calibration condition B; if the calibration condition B is met, conducting step 5; if the calibration condition B is not met, conducting step 4;

step 4, constituting the calibration condition B for the inner phase shifter i; the method is as follows:

4.1 according to a transmission path of the optical signal in the optical network, selecting the later one of the basic units whose one output port is connected to one input port of the basic unit with the inner phase shifter i and marking it as the basic unit f (selecting any one of the two basic units, if the two basic units are passed simultaneously).

4.2 adjusting the electrical signal input to the outer phase shifter of the basic unit f by the power supply, and finding and maintaining the electrical signal with the minimum power sum of the optical signals from the two optical output ports of the basic unit of the inner phase shifter i;

4.3 adjusting the electrical signal input to the inner phase shifter of the basic unit f by the power supply, and finding and maintaining the electrical signal with the minimum power strength sum of the optical signals from the two optical output ports of the basic unit of the inner phase shifter i, which meets the calibration condition B for the inner phase shifter i;

step 5, applying the calibration method with the satisfactory conditions to calibrate the inner phase shifter i;

step 6, verifying whether the inner phase shifters of all basic units have been calibrated; if yes, executing step 7; if not, returning to step 2;

step 7, selecting the outer phase shifter of any basic unit that is not calibrated and marking it as t, and constituting the larger Mach-Zehnder interferometer and marking it as m;

the method is as follows: selecting the two basic units located in front and back of the outer phase shifter t according to the optical network structure, and setting the two basic units to be in the beamsplitter mode (namely, an electrical signal corresponding to the $\pi/2$ phase which is input into the inner phase shifter by the power supply), at this time, the outer phase shifter t becomes the inner phase shifter relative to the constituted Mach-Zehnder interferometer m, so as to conform to the calibration condition A;

step 8, constituting the calibration conditions B and C for the outer phase shifter t, when optical signal passes through the basic units in the straight wage guide mode, the strengths thereof will remain unchanged, and all basic units with the inner phase shifters calibrated except the Mach-Zehnder interferometer m are set to be in the straight waveguide mode, namely the outer phase shifter t can conform to the calibration conditions B and C in the meantime;

step 9, applying the calibration method with the satisfactory conditions to calibrate the outer phase shifter t;

step 10, verifying whether the outer phase shifters of all basic units have been calibrated; if yes, ending the calibration process of the phase shifters that can be calibrated in the multi-stage staggered Mach-Zehnder interferometer, and turning to step 11; if not, returning to step 7;

step 11, ending.

The present invention is an efficient method for calibrating controllable phase shifter parameters in a configurable optical network of a multi-stage staggered Mach-Zehnder interferometer structure. With the method provided by the present invention, the following technical effect can be reached:

1. There is no necessary to add hardware for calibration, thereby reducing the loss of the optical network of the multi-stage staggered Mach-Zehnder interferometer from the hardware for calibration, and lowering the optical chip manufacturing difficulty.

2. Three calibration conditions are constituted for the controllable phase shifters (corresponding to steps 2, 4, 7 and 8) so that each controllable phase shifter can be calibrated by the calibration method with the satisfactory calibration conditions, thereby greatly improving the calibration efficiency, and facilitating the application of the optical network of the complicated multi-stage staggered Mach-Zehnder interferometer structure.

DESCRIPTION OF THE EMBODIMENTS

Figure 1:
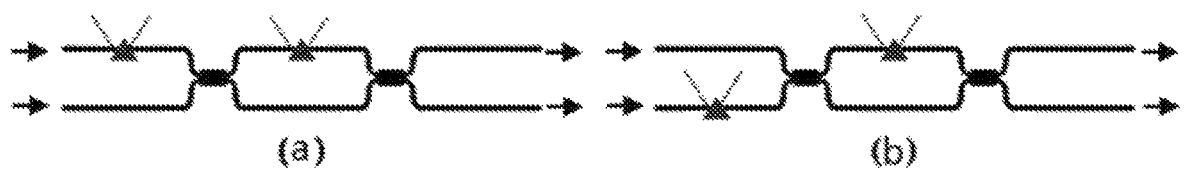
FIG. 1 illustrates basic units of a multi-stage staggered Mach-Zehnder interferometer structure.

FIG. 1 illustrates basic units of a multi-stage staggered Mach-Zehnder interferometer structure, namely the Mach-Zehnder interferometer including two phase shifters. All subgraphs show a relative position relation between the two phase shifters. In the figure, a triangle shows a controllable phase shifter, a rectangle shows a beamsplitter, a black line shows an optical waveguide, an arrow shows an optical input/output (I/O) port, and a dotted line shows an electrical input port.

The basic units in (a) and (b) of FIGS. 1 both have two beamsplitters, two controllable phase shifters (one is the inner phase shifter located between the two beamsplitters, and the other one is the outer phase shifter), two optical input ports, two optical output ports and two groups of electrical input ports (each group is connected to one controllable phase shifter). The beamsplitters, the controllable phase shifters and the optical inputs and outputs are connected by the optical waveguides. (a) of FIG. 1 shows that the two phase shifters are located on the same waveguide path, and (b) of FIG. 1 shows that the two phase shifters are located on the different waveguide paths.

Figure 2:
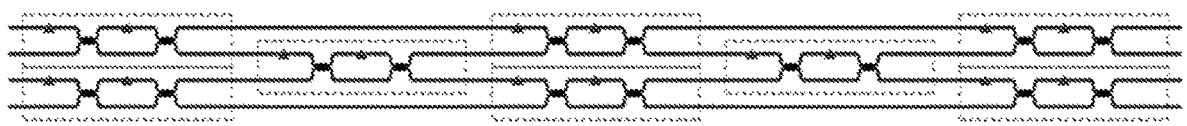
FIG. 2 illustrates a structure of an optical network of a multi-stage staggered Mach-Zehnder interferometers.

FIG. 2 illustrates a structure of an optical network of the multi-stage staggered Mach-Zehnder interferometer. This figure shows a staggered connection relation between all basic units in the optical network of the multi-stage staggered Mach-Zehnder interferometer. In this figure, each basic unit is outlined with the dotted lines. Any two mutually connected basic units conform to a "staggered condition", namely the two outputs of one basic unit are only connected to the inputs of two different interferometers, instead of being respectively connected to the two inputs of another basic unit. The basic units can be classified into different stages levels in an order in which the optical signal passes through the basic units. The optical network of the multi-stage staggered Mach-Zehnder interferometer has five levels, totaling 8 basic units in the figure.

Figure 3:
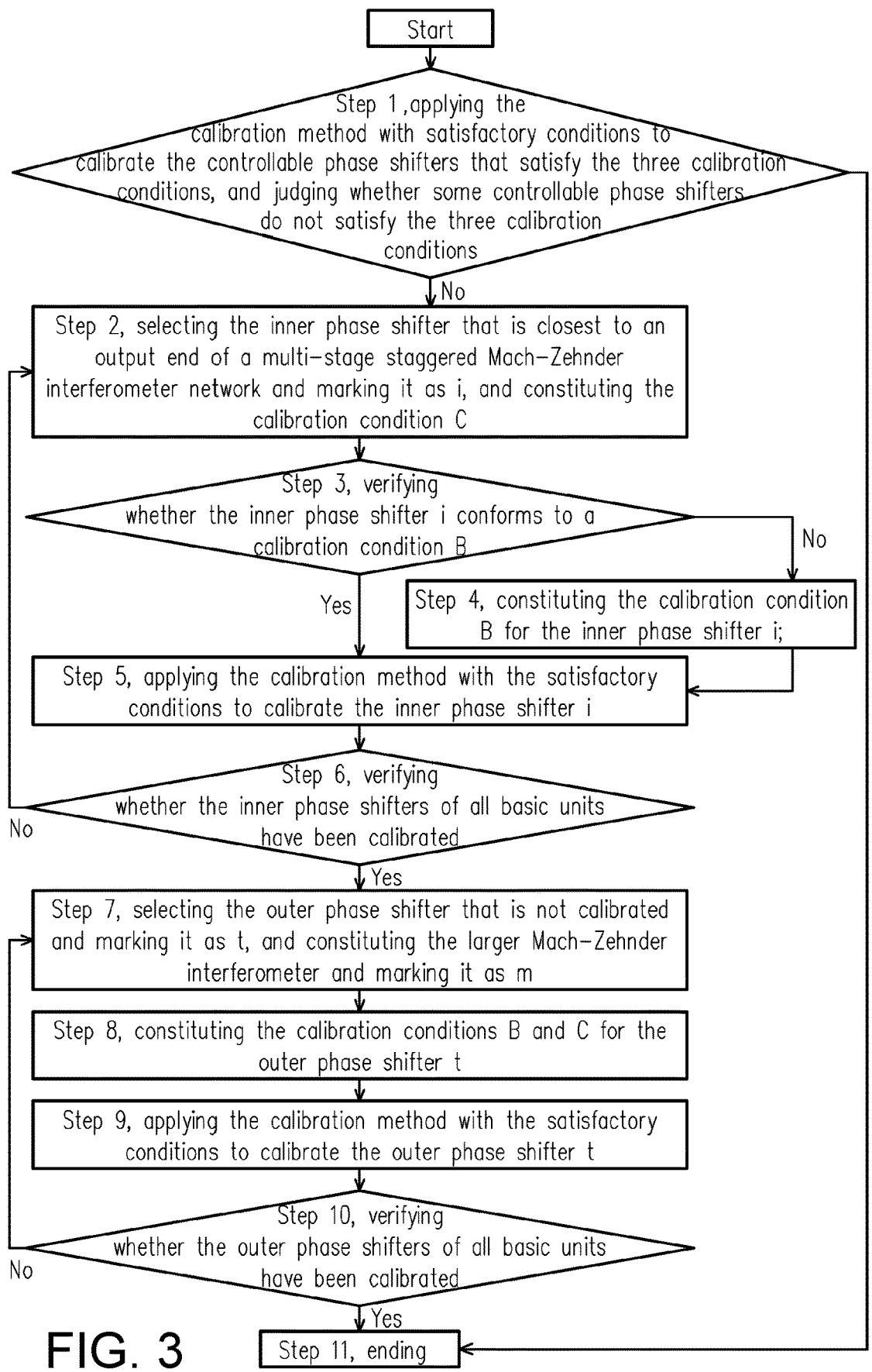
FIG. 3 illustrates a flow chart of the present invention.

FIG. 3 illustrates a flow chart of the present invention. The method provided by the present invention includes the following steps:

step 1, applying the calibration method with satisfactory conditions to calibrate the controllable phase shifters that satisfy the three calibration conditions; turning to step 2 if some controllable phase shifters do not satisfy the three calibration conditions; turning to step 11 if all controllable phase shifters satisfy the three calibration conditions;

step 2, selecting the inner phase shifter of the basic unit (namely one Mach-Zehnder interferometer) that is not calibrated and is closest to an output end of a multi-stage staggered Mach-Zehnder interferometer network and marking it as i (the controllable phase shifter conforms to the condition A), and constituting the calibration condition C;

setting all basic units with the inner phase shifters calibrated to be in a straight waveguide mode (namely the power supply inputs the electrical signal corresponding to a $\pi$ phase to the inner phase shifter), so as to conform to the calibration condition C;

step 3, verifying whether the inner phase shifter i conforms to the calibration condition B; if the calibration condition B is met, conducting step 5; if the calibration condition B is not met, conducting step 4;

step 4, constituting the calibration condition B for the inner phase shifter i; the method is as follows:

4.1 according to a transmission path of the optical signal in the optical network, selecting the later one of the basic units whose one output port is connected to one input port of the basic unit with the inner phase shifter i and marking it as the basic unit f (selecting any one of the two basic units which are passed simultaneously).

4.2 adjusting the electrical signal input to the outer phase shifter of the basic unit f by the power supply, and finding and maintaining the electrical signal with the minimum power sum of the optical signals from the two optical output ports of the basic unit of the inner phase shifter i;

4.3 adjusting the electrical signal input to the inner phase shifter of the basic unit f by the power supply, and finding and maintaining the electrical signal with the minimum power sum of the optical signals from the two optical output ports of the basic unit of the inner phase shifter i, namely conform to or satisfy the calibration condition B for the inner phase shifter i;

step 5, applying the calibration method with the satisfactory conditions to calibrate the inner phase shifter i;

step 6, verifying whether the inner phase shifters of all basic units have been calibrated; if yes, executing step 7; if not, returning to step 2;

step 7, selecting the outer phase shifter of any basic unit that is not calibrated and marking it as t, and constituting the larger Mach-Zehnder interferometer and marking it as m;

step 8, constituting the calibration conditions B and C for the outer phase shifter t, when optical signal passes through the basic units in the straight wage guide mode, the strengths thereof will remain unchanged, and all basic units calibrated with the inner phase shifters except the Mach-Zehnder interferometer m are set to be in the straight waveguide mode, namely the outer phase shifter t can conform to the calibration conditions B and C in the meantime;

step 9, applying the calibration method with the satisfactory conditions to calibrate the outer phase shifter t;

step 10, verifying whether the outer phase shifters of all basic units have been calibrated; if yes, ending the calibration process of the phase shifters that can be calibrated in the multi-stage staggered Mach-Zehnder interferometer, and turning to step 11; if not, returning to step 7;

step 11, ending.

What is claimed is:

1. A method for calibrating controllable phase shifters in multi-stage staggered Mach-Zehnder interferometer on optical chip, comprising a step 1, a step 2, a step 3, a step 4, a step 5, a step 6, a step 7, a step 8, a step 9, a step 10, and a step 11, wherein:

the step 1: applying a calibration method with satisfactory conditions to calibrate the controllable phase shifters that satisfy three calibration conditions; turning to the step 2 if some controllable phase shifters do not satisfy the three calibration conditions; turning to step 11 if all controllable phase shifters satisfy the three calibration conditions;

the three calibration conditions comprise:

calibration condition A: Mach-Zehnder interferometer structure condition, namely, the controllable phase shifter to be calibrated is an inner phase shifter of a Mach-Zehnder interferometer;

calibration condition B: single-ended optical signal input condition, namely the Mach-Zehnder interferometer has only one input port with optical signal input, but no optical signal is input into another input port; and calibration condition C: direct independent output measurement condition, namely, a magnitude strength of the optical signal is measurable from single optical output port of the Mach-Zehnder interferometer, wherein the Mach-Zehnder interferometer has two optical output ports, and the direct independent output measurement condition requires that the magnitude strength of the optical signal output from any port is measurable;

the step 2: selecting an inner phase shifter of basic units that is not calibrated and is closest to an output end of a multi-stage staggered Mach-Zehnder interferometer network and marking it as inner phase shifter i, and constituting the calibration condition C; setting all calibrated inner phase shifters of the basic units to be in a straight waveguide mode, namely a power supply inputs an electrical signal corresponding to a π phase of the inner phase shifters, so as to conform to the calibration condition C; each of the basic units is one Mach-Zehnder interferometer;

the step 3: verifying whether the inner phase shifter i conforms to the calibration condition B; if the calibration condition B is conformed, executing the step 5; if the calibration condition B is not conformed, turning to the step 4;

the step 4: constituting the calibration condition B for the inner phase shifter i; the step 4 comprises a step 4.1, a step 4.2, and a step 4.3, wherein:

the step 4.1: according to a transmission path of the optical signal in the optical network, selecting the later one of the basic units whose one output port is connected to one input port of the basic units with the inner phase shifter i and marking it as a basic unit f; selecting any one of the two basic units if the two basic units are passed simultaneously;

the step 4.2: adjusting the electrical signal input to an outer phase shifter of the basic unit f by the power supply, and finding and maintaining the electrical signal with the minimum power sum of the optical signals from two optical output ports of the basic units of the inner phase shifter i; and the step 4.3: adjusting the electrical signal input to the inner phase shifters of the basic unit f by the power supply, and finding and maintaining the electrical signal with the minimum power sum of the optical signals from the two optical output ports of the basic units of the inner phase shifter i, which meets the calibration condition B for the inner phase shifter i;

the step 5: applying the calibration conditions met the calibration method with the satisfactory conditions to calibrate the inner phase shifter i;

the step 6: verifying whether the inner phase shifters of all basic units have been calibrated; if yes, executing the step 7; if not, returning to the step 2;

the step 7: selecting one outer phase shifter of the basic units that is not calibrated and marking it as outer phase shifter t, and constituting a larger Mach-Zehnder interferometer and marking it as constituted Mach-Zehnder interferometer m, resulting the outer phase shifter t becomes the inner phase shifter relative to the constituted Mach-Zehnder interferometer m, so as to conform to the calibration condition A;

constituting the larger Mach-Zehnder interferometer comprising:

selecting two basic units located in front and back of the outer phase shifter t according to an optical network structure, and setting the two basic units to be in a beamsplitter mode, namely, an electrical signal corresponding to the π/2 phase is input into electrical input ports of the inner phase shifters by the power supply;

the step 8: constituting the calibration conditions B and C for the outer phase shifter t, namely, basic units of all calibrated inner phase shifters except the Mach-Zehnder interferometer m are set to be in the straight waveguide mode;

the step 9: applying the calibration conditions met the calibration method with the satisfactory conditions to calibrate the outer phase shifter t;

the step 10: verifying whether the outer phase shifters of all basic units have been calibrated; if yes, turning to the step 11; if not, returning to the step 7; and the step 11: ending.

* * * * *